US009054901B2

(12) United States Patent
Hessel

(10) Patent No.: US 9,054,901 B2
(45) Date of Patent: Jun. 9, 2015

(54) SIMPLIFIED BLIND SIGNAL DETECTOR

(75) Inventor: Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 353 days.

(21) Appl. No.: 13/413,805

(22) Filed: Mar. 7, 2012

(65) Prior Publication Data

US 2013/0237160 A1   Sep. 12, 2013

(51) Int. Cl.
*H04B 15/00* (2006.01)
*H04B 1/38* (2006.01)
*H04B 1/40* (2006.01)
*H04B 1/46* (2006.01)
*H04L 27/00* (2006.01)
*H04W 16/14* (2009.01)

(52) U.S. Cl.
CPC ........... *H04L 27/0006* (2013.01); *H04W 16/14* (2013.01); *H04L 27/0012* (2013.01)

(58) Field of Classification Search
CPC ............ H04W 16/14; H04W 72/0453; H04W 72/0446; H04W 72/082; H04W 16/32; H04W 24/00; H04W 24/02; H04W 24/04; H04W 28/12; H04W 36/14; H04W 36/30; H04W 4/005; H04W 4/008; H04W 72/042; H04W 72/08
USPC .......................................... 455/73, 75, 79, 62
See application file for complete search history.

(56) References Cited

U.S. PATENT DOCUMENTS

2011/0143700 A1*   6/2011   Lagunas Hernandez et al. .......................... 455/226.1

OTHER PUBLICATIONS

Yonghong Zeng, "Eigenvalue based Spectrum Sensing Algorithms for Cognitive Radio", Nov. 23, 2009, IEEE, and Ying-Chang Liang, Senior Member, IEEE Institute for Infocomm Research, A STAR, Singapore, 12 pages.*
Zeng, Y., et al., "Eigenvalue based Spectrum Sensing Algorithms for Cognitive Radio", pp. 1-12, Nov. 23, 2009, [online; retrieved on Jul. 10, 2012].

\* cited by examiner

*Primary Examiner* — Ping Hsieh
*Assistant Examiner* — Xin Jia
(74) *Attorney, Agent, or Firm* — Robert J. Sacco, Esq.; Fox Rothschild LLP

(57) ABSTRACT

A method for detecting a presence of an RF signal begins by forming with at least one computer processor a sample correlation matrix A from a sample of a radio frequency channel. Thereafter, the at least one computer processor determines a trace tr(A) of the sample correlation matrix and a determinant det(A) of the sample correlation matrix. The at least one processor then selectively determines a presence or absence of a signal on the radio frequency channel based exclusively on the trace, the determinant and a threshold value T. The invention also includes a cognitive radio which includes a radio receiver configured to detect an RF signal and at least one computer processing device for performing the above-described method.

20 Claims, 3 Drawing Sheets

SIMPLIFIED BLIND SIGNAL DETECTOR

BACKGROUND OF THE INVENTION

1. Statement of the Technical Field

The inventive arrangements relate to sensing algorithms for radio systems, and more particularly to systems for detecting occupancy of an RF frequency channel at low or negative signal to noise ratios.

2. Description of the Related Art

Cognitive radio systems are comprised of a network of radio transceivers that automatically change their transmission or reception parameters in response to a spectral environment. This process of dynamic frequency modification is sometimes referred to as dynamic spectral allocation ("DSA"). In such a system, the radio transceivers automatically choose the frequency on which to communicate with each other. The frequency used to communicate among network nodes is usually selected in such a way as to minimize interference with other users of the same spectrum. For example, the frequency can be selected to avoid interference with a class of wireless spectrum user which has been designated as a primary user of such spectrum. Alternatively, or in addition, the frequency can be selected to avoid interference with a source of interference, such as a jamming signal.

In a DSA system, the active control over the parameters of transmission and reception generally relies upon certain cognitive radio activities. These activities include spectrum monitoring and dynamic selection of transmission frequency among network nodes. To facilitate these processes, there is a need to determine occupancy of an RF frequency channel, e.g., by a primary user of the same spectrum or by any other interfering signal. Still, it can be difficult to quickly and efficiently determine channel occupancy when the signals involved have very low or negative signal to noise ratios. The problem is compounded in the military environment where nothing a priori is known about the primary user. In contrast, the primary user of a frequency spectrum is usually known in a commercial environment.

Current methods for detecting channel occupancy require a substantial amount of signal processing. Three common classes of detectors are known in the art for this purpose. The so-called Pseudo Spectrum method is the least sensitive and does a poor job of detecting wide-band signals. The Cyclostationary method is processing intensive and generally works best when a priori knowledge is available regarding the potential occupying signals. Finally, there is the so-called Eigenvalue method. This method is very sensitive and functions well for a wide range of signal types, but is very processing intensive and therefore not especially well suited for occupancy sensing which must be performed very quickly.

SUMMARY OF THE INVENTION

The invention concerns a method for detecting a presence of an RF signal. The method begins by forming with at least one computer processor a sample correlation matrix A from a sample of a radio frequency channel. Thereafter, the at least one computer processor determines a trace tr(A) of the sample correlation matrix and a determinant det(A) of the sample correlation matrix. The at least one processor then selectively determines a presence or absence of a signal on the radio frequency channel based exclusively on the trace, the determinant and a threshold value T. The invention also includes a cognitive radio which includes a radio receiver configured to detect an RF signal and at least one computer processing device for performing the above-described method According to another aspect, the method includes forming with at least one computer processor a sample correlation matrix A from a sample of a radio frequency channel. The at least one computer processor then determines a trace tr(A) of the sample correlation matrix and a determinant det(A) of the sample correlation matrix. The at least one computer processor uses this information to compute a metric $S=T \cdot det(A)-(tr(A)/N)^N$ where N is the row and column size of the sample correlation matrix and T is a threshold value. Thereafter, the at least one computer processor selectively determines a presence or absence of a signal on the radio frequency channel based on a calculated value of S. The invention also includes a cognitive radio which includes a radio receiver configured to detect an RF signal and at least one computer processing device for performing the above-described method.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The invention concerns a simplified type of blind signal detector, and a method for performing signal detection. The process begins by obtaining a sampling of an RF frequency channel. The sample is used by a computer processor to create a sample correlation matrix A, where the sample correlation matrix has n rows and columns. The processor then calculates a trace tr(A) and a determinant det(A) for the sample correlation matrix. Thereafter, the processor selectively determines a presence or absence of a signal on said radio frequency channel based exclusively on the trace, the determinant and a threshold value T.

According to one aspect of the invention, the trace, the determinant, and T are used to compute a metric S. Thereafter, the sign of the metric S is used to determine the absence or presence of a signal contained on the RF frequency channel which has been sampled. More particularly, if the value of S is negative, this will serve as an indication that a signal is present. Conversely, if the sign is positive, this will serve as an indication that a signal is not present on the RF frequency channel.

The process described herein can be particularly useful in a cognitive radio system which use a dynamic spectral allocation ("DSA") method to select transmission frequencies for a network of radio transceivers. Accordingly, it is convenient to describe the invention in the context of a network comprised of two or more cognitive radios. Still it should be understood that the invention is not limited in this regard, and the blind signal detector system and method described herein can be used in any other system where signals are to be detected.

Figure 1:
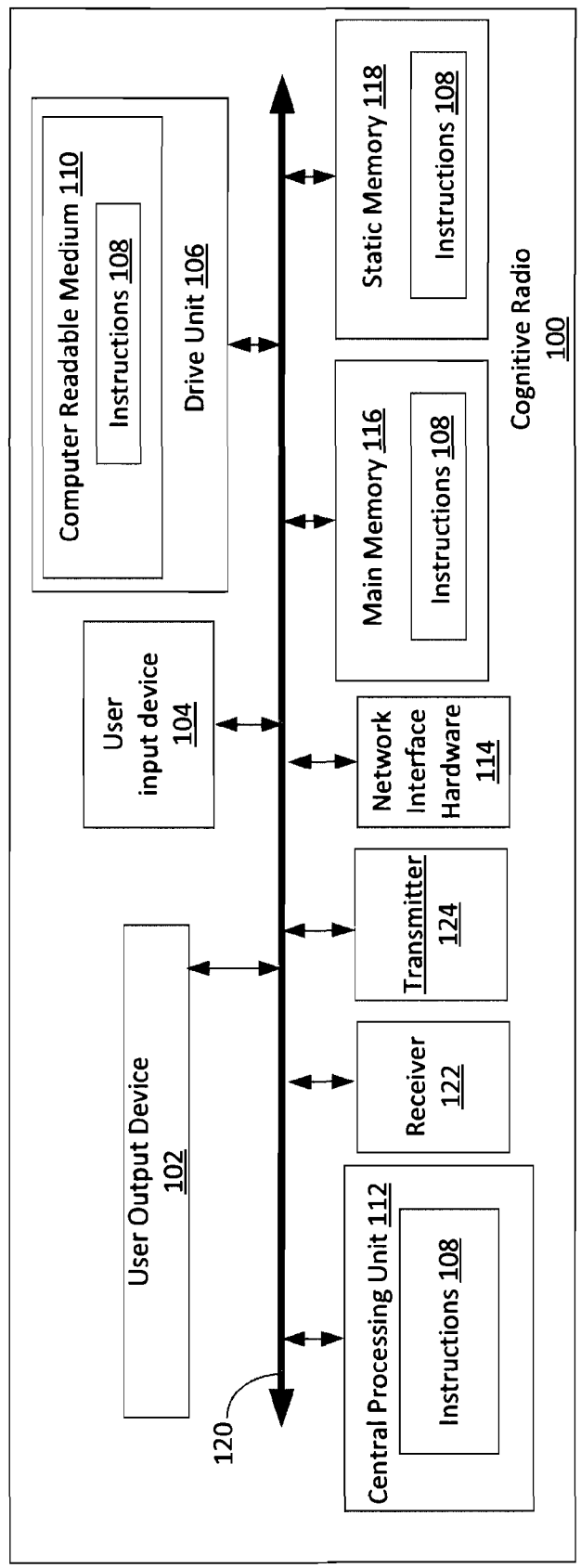
FIG. 1 is a block diagram of a cognitive radio that is useful for understanding the inventive arrangements.

Referring now to FIG. 1 there is shown a cognitive radio 100 that is useful for understanding the invention. The cognitive radio 100 can include a central processing unit 112, a main memory 116, and a static memory 118, which communicate with each other via system bus 120. Cognitive radio 100 can also include a transmitter 124 through which radio frequency signals may be transmitted, and a receiver through which radio frequency signals can be received. According to a preferred embodiment, the cognitive radio 100 includes a transceiver in place of the receiver and transmitter, where the transceiver operates as both a transmitter and receiver.

One or more user input devices 104 can be included in the cognitive radio 100, such as a keyboard and/or cursor control device. A user output device 104, such as a display screen can be used to communicate information to the user concerning the operations and status of the cognitive radio 100. User input devices 104 and user output devices 102 can communicate with the central processing unit through a system bus, but may also be connected by other interface and bus structures. Network interface hardware 114 can facilitate data communication operations with other data processing equipment to which the cognitive radio device is connected by wired or wireless means.

A drive unit 106 includes a computer-readable storage medium 110 on which is stored one or more sets of instructions 108 (e.g., software code) configured to implement one or more of the methodologies, procedures, or functions described herein. The instructions 108 can also reside, completely or at least partially, within the main memory 116, the static memory 118, and/or within the central processing unit 112 during execution thereof by the cognitive radio 100. The main memory 116 and the central processing unit 112 also can constitute machine-readable media.

The term "computer-readable storage medium" shall be understood to include any medium that is capable of storing, encoding or carrying a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a computer-readable medium or a distribution medium, as listed herein and to include recognized equivalents and successor media, in which the software implementations herein are stored. Those skilled in the art will appreciate that the device architecture illustrated in FIG. 1 is one possible example of a cognitive radio in which the inventive arrangements can be implemented. However, the invention is not limited in this regard and any other suitable computing device architecture can also be used without limitation.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

Figure 2:
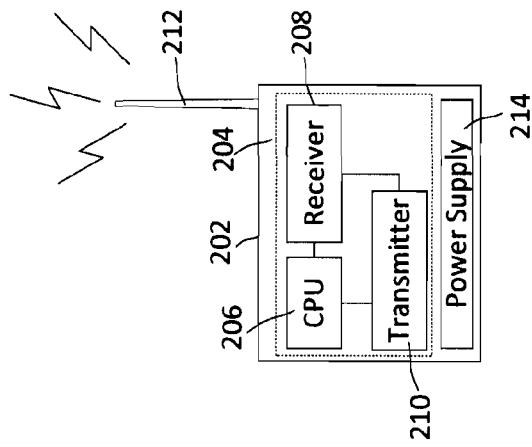
FIG. 2 is a block diagram of a communication system that is useful for understanding the context in which the inventive arrangements can be utilized.
Figure 2:
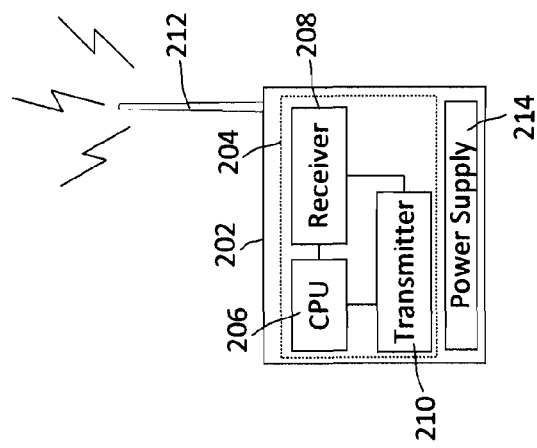
Figure 2:
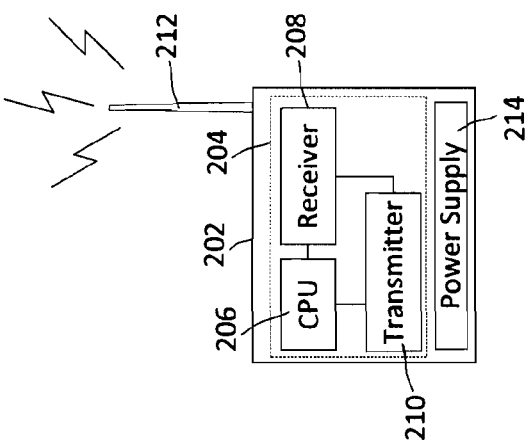

Turning now to FIG. 2, there is shown a schematic representation of a communication system 200. The communications system 200 can include one or more communication devices 202 which can include a cognitive radio 204. The cognitive radios 204 can have an architecture similar to the cognitive radio 100 described herein with respect to FIG. 1. The cognitive radios 204 can include all or some of the functionality of cognitive radio 100. Accordingly, the cognitive radio 204 can include a central processing unit (CPU) or processor 206 arranged in communication with a receiver 208 and a transmitter 210. Alternatively, a transceiver can be used in place of the receiver/transmitter combination.

The processor 206 can be programmed with a set of instructions for carrying out the methods and processes described herein for implementing an ad-hoc network. The processor can also be programmed to receive information concerning an RF environment, including for example spectrum sensing information. More particularly, the processor 206 is advantageously programmed to control the operation of receiver 208 to detect the presence of primary users or other forms of interference operating within a range of frequencies. This information can then be used by the processor 206 to classify various frequencies as either clear or occupied. A clear frequency is one where RF transmissions associated with a primary user or another source of interference are of negligible signal strength as compared to some predetermined threshold, or otherwise are not present. An occupied frequency is one that does contain RF transmission signals associated with a primary user or with a source of interference at levels that exceed some predetermined threshold signal level. Accordingly, the cognitive radio 204 can determine which portions of the RF spectrum contain frequencies that are currently occupied by primary users, and which frequencies are available for implementing an ad-hoc network.

Figure 3:
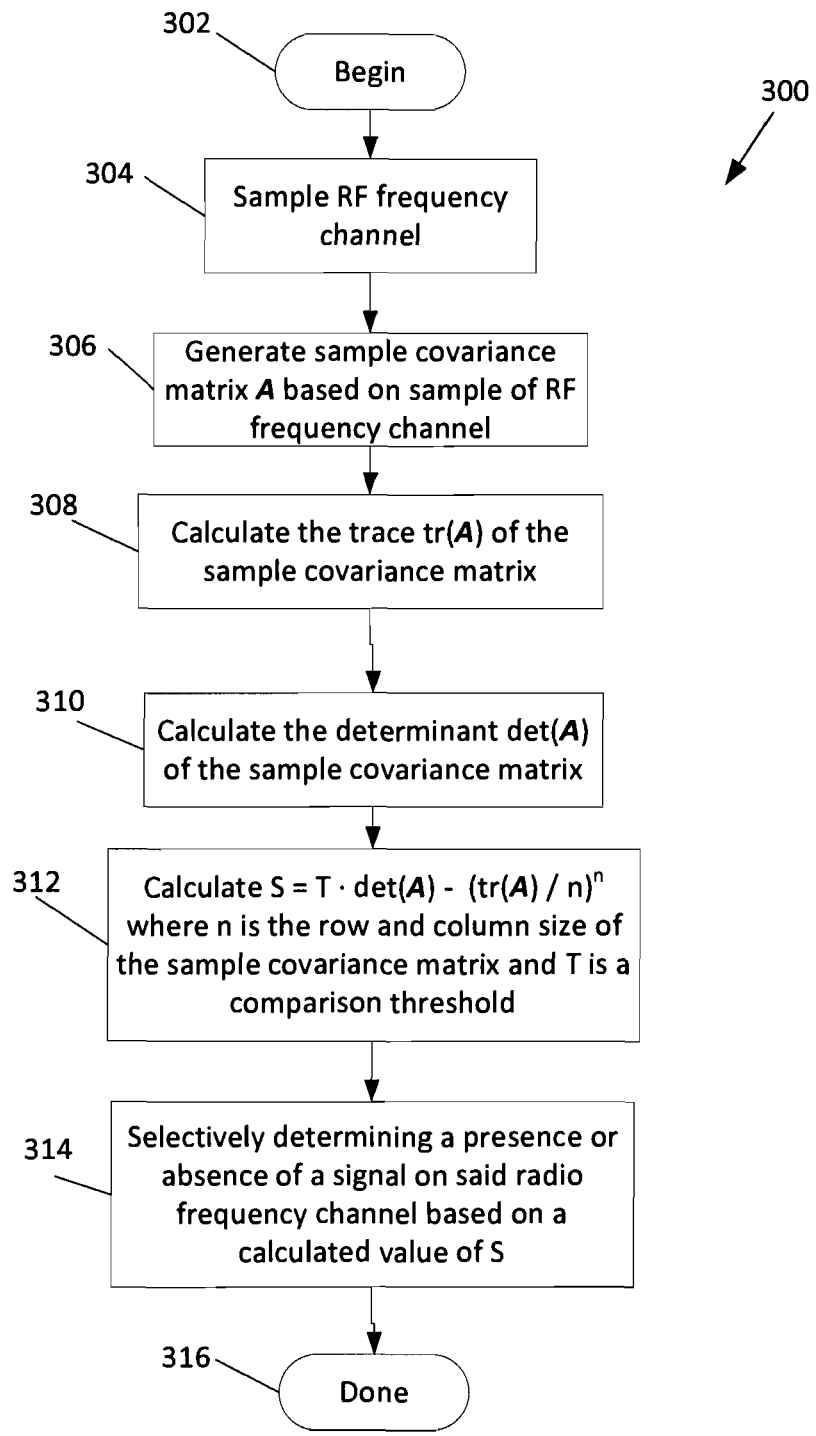
FIG. 3 is a flowchart that is useful for understanding a process for detecting the presence of a signal in a sampled RF channel.

Referring now to FIG. 3, there is shown a flowchart that is useful for understanding a simplified blind signal detector process 300 which can be used for sensing the presence of signals on an RF frequency channel. In an embodiment of the invention, the simplified blind signal detector can be implemented in a cognitive radio similar to those described above in relation to FIGS. 1 and 2. For example, the simplified blind signal detector can be implemented as a software routine executing on processing unit 112 and/or CPU 206. The software routine for the simplified blind signal detector can be stored as a machine readable set of instructions stored in a memory, such as computer readable medium 110 or main memory 116. Of course, the simplified blind signal detector is not limited for use in a cognitive radio. Instead, the detector described herein can be implemented in any other system where RF signal detection is necessary or desirable. Also, it will be appreciated by those skilled in the art that the inventive arrangements described herein can be implemented in software, in hardware, or any suitable combination thereof.

Process 300 can begin in step 302 and continues in step 304, which comprises sampling an RF frequency channel. The RF frequency channel can be represented as a continuous time signal $x_c(t)=s_c(t)+\eta_c(t)$, where $s_c(t)$ is a possible signal to be detected and $\eta_c(t)$ represents noise contained in the channel. For purposes of this discussion, it shall be assumed that RF frequency channel under evaluation has a bandwidth W and a center frequency of $f_c$. The continuous time signal $x_c(t)$ is sampled at some sampling rate $f_s$, where $f_s$ is greater than or equal to W. It shall be further assumed that $s_c(t)$ is the received signal and includes any environmental effects associated with transmission of the signal across a transmission medium. As will be appreciated by those skilled in the art, these effects can include various factors such as fading, multipath, and dispersion. The noise $\eta_c(t)$ contained in the continuous time signal is assumed to be white noise. For purposes of the present invention a sample rate that follows the Nyquist criteria is sufficient to detect any signal that the algorithm is capable of detecting. Still, it should be understood that many signals are detectable even when the Nyquist criteria is not met, especially when the bandwidth edge of the target signal occurs in the sampling bandwidth of the detector. Accordingly, the invention is not limited to sampling performed at the Nyquist rate. Sampling can be performed at rates that are above or below the Nyquist rate.

Methods and systems for sampling a continuous time signal are well known in the art and therefore will not be described here in detail. However, it should be understood that the result of the sampling step 304 is a series of data samples $x_n$ where n=0, 1, 2 . . . . Also, it should be noted that in some embodiments, the sampling step can be performed in advance and/or can be performed by a different process not shown. In such instances, the sampling step can simply be a matter of accessing or retrieving digital data from an existing memory or database location. Accordingly, sampling step 304 can be an optional step in certain inventive arrangements.

The process continues in step 306 by generating a sample correlation matrix A that is based on the data samples of the RF frequency channel obtained in step 304. A correlation matrix is a square matrix having an equal number of rows and columns. More particularly, the correlation matrix computes the correlation coefficients of the columns of a matrix. That is, the value at row i and column j of the correlation matrix is the correlation between a set of signal samples and a delayed or advanced version of the same sampled signal, where the value k indicates the amount of delay or advance in the sampled signal. More particularly, it is known in the art that for sample set $x_0, x_1, x_2, \ldots, x_{N-1}$, the sample correlation matrix is:

$$\begin{bmatrix} R_{xx}(0) & R_{xx}(-1) & R_{xx}(-2) & \ldots & R_{xx}(1-N) \\ R_{xx}(1) & R_{xx}(0) & R_{xx}(-1) & \ldots & R_{xx}(2-N) \\ R_{xx}(2) & R_{xx}(1) & R_{xx}(0) & \ldots & R_{xx}(3-N) \\ \ldots & \ldots & \ldots & \ldots & \ldots \\ R_{xx}(N-1) & R_{xx}(N-2) & R_{xx}(N-3) & \ldots & R_{xx}(0) \end{bmatrix}$$

$$R_{xx}(k) = \frac{1}{N} \cdot \sum_{n=-k}^{N-1} (x_{n+k} \cdot \overline{x_n})$$

where the correlation coefficients, $R_{xx}(k)$ are defined as:

$$R_{xx}(k) = \frac{1}{N} \cdot \sum_{n=0}^{N-1-k} (x_{n+k} \cdot \overline{x_n})$$

for k<0 and
for k≥0
and where the overbar notation $\overline{x_n}$ denotes the complex conjugate of a sample $x_n$. Notably, matrix A is referred to herein as the sample correlation matrix (rather than the statistical correlation matrix) since only a finite number of data samples are available.

As known in the art, a set of eigenvalues can be calculated for a sample correlation matrix. Given a square matrix A, an eigenvalue λ and its associated eigenvector v are, by definition, a pair obeying the relation Av=λv where v is nonzero. Notably, an ideal correlation matrix for a white noise process will have eigenvalues that are all zero. In contrast, a sample correlation matrix would not be expected to have eigenvalues which are zero because the size of data sample is limited. Still, in the case of a white noise process, it can be anticipated that the eigenvalues for a sample correlation matrix should be relatively small. Moreover, it can be expected in such a scenario that the eigenvalues will be positive values and will be approximately equal to each other.

Given the foregoing, one can infer that a sampled signal is comprised of only white noise where the eigenvalues of a sample correlation matrix are small, positive and approximately equal to each other. Conversely, if the eigenvalues of a particular sample correlation matrix are found vary to any significant extent, then this variation can serve as an indication that the sample correlation matrix is not one that is based on a process comprised purely of noise. In other words, any significant variation in the eigenvalues for the correlation matrix can serve as an indication that a signal other than noise is present in the sampled RF channel. The foregoing property is useful for purposes of detecting the presence of a signal in an RF communication channel. Still, it is a very time intensive processing task to calculate the eigenvalues of a sample correlation matrix. Accordingly, the remaining steps in process 300 provide a way to overcome this limitation by testing the variation of the eigenvalues for a sample correlation matrix without actually calculating the eigenvalues.

Referring now to step 308, the process continues by calculating the trace tr(A) for the sample correlation matrix. The trace of an n-by-n square matrix A is defined as the sum of the elements on the main diagonal (the diagonal from the upper left to the lower right) of A. The process continues in step 310 by calculating the determinant det(A) of the sample correlation matrix. Methods for calculating the determinant of a matrix are well known in the art and therefore will not be described herein in detail. Any such method now known or known in the future can be used for this purpose. Note that the determinant can be referred to as det(A) or |A|.

The process continues on to step 312 in which a metric S is calculated that is useful for evaluating whether or not a signal is present in the sampled RF channel. Specifically, the value of S is calculated as:

$$S = T \cdot \det(A) - \left(\frac{tr(A)}{N}\right)^N$$

where n is the row and column size of the sample correlation matrix and T is a comparison threshold.

Once the value of the metric S has been calculated, the process continues on to step 314. In step 314 a determination is made as to the presence or absence of a signal in the sampled RF channel. This determination is based the value of the metric S. More particularly, the determination can be made based on a sign of the metric S. For example, if the value of S is negative, this will serve as an indication that a signal is present in the sampled RF channel. Conversely, if the value of S is positive, this will serve as an indication that a signal is not present in the sampled RF channel. Still, the invention is not limited in this regard.

In order to more fully understand the foregoing, consider the exemplary three by three matrix A presented below.

$$A = \begin{bmatrix} x_{1,1} & x_{1,2} & x_{1,3} \\ x_{2,1} & x_{2,2} & x_{2,3} \\ x_{3,1} & x_{3,2} & x_{3,3} \end{bmatrix}$$

Those skilled in the art will appreciate that the invention is not limited to use with a three by three matrix, but instead can be applied to any size of matrix.

It is well known in the art that the trace of a matrix (which is simply the sum of the diagonal elements) is equal to the sum of its eigenvalues ($e_n$). For the exemplary matrix A presented above, we express this concept as follows:

$$tr(A) = \sum_{n=1}^{N} x_{n,n} = \sum_{n=1}^{N} e_n$$

where
tr(A) is the trace for matrix A;
$x_{n,n}$ is the value of the matrix element at position n, n;
N is the maximum value for n within a particular matrix (e.g., N would be 3 in the matrix A); and
$e_n$ is the $n^{th}$ eigenvalue (note that, in general, an N×N matrix will have N eigenvalues).

It is known that the determinant of a matrix is equal to the product of its eigenvalues. For the exemplary matrix A presented above, we express this concept as follows:

$$det(A) = \prod_{n=1}^{N} e_n$$

If is further known in the art that a correlation matrix is a Toeplitz matrix, and these matrices are positive definite matrices. This means that all of the eigenvalues for the matrix are positive. It is well known that the arithmetic mean of a list of non-negative real numbers is greater than or equal to the geometric mean of the same list, and these two means will be equal if and only if every number in the list is the same. The foregoing statement in mathematics is known as the inequality of arithmetic and geometric means. Given the foregoing, it will be understood that for any given trace, or sum of eigenvalues, the determinant, or product of eigenvalues, will be maximized when the eigenvalues are all equal. With this information in mind, it will be understood that the trace can be used as a way of calculating the maximum possible value for the determinant. In particular, the average value of the eigenvalues can be calculated as the sum of the eigenvalues (i.e., the trace) divided by the number of eigenvalues (N):

$$\text{Average value of } eigenvalues = \frac{tr(A)}{N}$$

Accordingly, the maximum possible value for the determinant (the product of the eigenvalues) for the matrix A (i.e., max(det(A)) can be expressed as the product of the N average values. We can express this as:

$$max(det(A)) = \left(\frac{tr(A)}{N}\right)^N$$

For purposes of evaluating the presence of a signal in the channel, this maximum value for the determinant can be compared to the actual value of the determinant for the matrix A in the form of a ratio as follows:

$$\frac{max(det(A))}{det(A)} = \frac{\left(\frac{tr(A)}{N}\right)^N}{det(A)}$$

In order to understand the basis for this evaluation, recall that all of the eigenvalues for a sampled correlation matrix will be approximately equal in the absence of a signal in the sampled RF channel. Conversely, the presence of a signal will cause the eigenvalues to have different values relative to each other. As explained above, the maximum value for the determinant det(A) occurs when all of the eigenvalues are equal. Accordingly, if the eigenvalues are in fact approximately equal, then it can be expected that the actual value of det(A) based on the sampled channel, will be approximately equal to the maximum possible value for the determinant, i.e., max(det(A))=det(A). Under such circumstances, the ratio of the two values $$\frac{max(det(A))}{det(A)}$$

will be approximately equal to one. Conversely, if the eigenvalues are not equal, then the actual value of det(A) for the sampled channel will be reduced relative to the maximum possible value, and the ratio will be greater than one.

The actual value for det(A) will decrease as the variation among the eigenvalues increases. And the variation among the eigenvalues will increase in the presence of a signal. Accordingly, the ratio of max(det(A))/det(A) will increase in value as it becomes more likely that a signal is present. Logically, then it can then be said that the ratio can serve as an indicator of the likelihood that a signal is present. A ratio value close to one indicates the absence of a signal. As the ratio value increases beyond the value of 1, it can be concluded that it is increasingly likely that a signal is present in the sampled channel.

Given the foregoing, one can determine a value for the ratio max(det(A))/det(A) that corresponds to certain degrees of confidence that a signal is actually present in a sampled RF channel. In other words, we can say that a signal is present (with a certain degree of confidence) if:

$$\frac{\max(\det(A))}{\det(A)} = \frac{\left(\frac{tr(A)}{N}\right)^N}{\det(A)} > T$$

where T is a threshold value for declaring the presence of a signal. If the ratio exceeds the value of T, then a signal is said to be present. If the ratio is less than the value of T, then it is inferred that the sampled channel is absent of a signal. This expression can be rearranged as shown below:

$$S = \det(A) \cdot T - \left(\frac{tr(A)}{N}\right)^N < 0$$

We can then state, based on this expression, that a signal is present in the sampled RF channel when the metric S has a value less or equal to zero. Those skilled in the art will appreciate that a value of T can be determined mathematically. However, it is preferred that the value be instead determined based on computer simulations in which the sampled RF frequency channel in FIG. 3 is provided with a source exclusively comprised of white noise and absent of any signal. This noise signal is then sampled, and a maximum value for the metric S is computed over a large number of sample periods. A threshold value T can then be selected which generally ensures that the metric S will substantially always have a positive value when the RF channel is exclusively comprised of noise. In other words, T can be chosen so that negative values of S are minimal when a sampled channel is purely comprised of noise.

The process described herein with respect to FIG. 3 is one possible way that the trace, the determinant, and a threshold value T can be used to evaluate the presence of a signal in a sampled channel. However, it should be understood that the invention is not limited in this regard. Instead, these values can be used in any suitable way to detect the presence of a signal on an RF channel, and all such methods are intended to be included in the scope of the invention. For example, the presence or absence of a signal can be determined by calculating a trace tr(A) of the sample correlation matrix, calculating a determinant det(A) of the sample correlation matrix, and then determining a presence or absence of a signal on a radio frequency channel based on said trace and said determinant Usually, this will involve at least one additional calculation, but any suitable approach is acceptable provided that the signal presence is based on an evaluation of the referenced trace and determinant. For example, the presence or absence of a signal on a radio frequency channel can be determined by computing a ratio of det(A) and max(det(A)), where max(det(A)) is a maximum possible value for the determinant of matrix A.

The methods and systems described herein are sufficiently sensitive such that false indications of signal presence can be caused due to the correlating effect of the intermediate frequency (IF) signal processing included within the design of a radio receiver. To avoid this potential for creating false indications of signal presence, the threshold value T can be raised or adjusted so as to make the detection process somewhat less sensitive. A solution for this problem can involve a calibration method for the system in which the radio receiver is provided with a source of white noise. A sample correlation matrix is then created base on the white noise source. This captures the correlating effect that is inherent in the signal processing associated with the radio receiver. The resulting sample correlation matrix can then be inverted and used to remove the correlation effects introduced by the radio receiver signal processing. More particularly, the radio receiver correlation effects are removed by multiplying any new sample autocorrelation matrix by this inverse, thereby resulting in the removal of all the radio effects. This approach permits use of a threshold value T which is essentially an ideal value, and prevents and avoids the need to sacrifice detection sensitivity for purposes of avoiding false indications of signal detection. One undesirable side effect of this method is a slight loss of the conjugate symmetry in the resultant matrix, which causes the eigenvalues to have complex values. Accordingly, this negative effect can be counteracted by adding the resultant matrix to its conjugate transpose (also known as the Hermitian). This creates the desired correlation matrix form with no measurable degradation to the method.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents

I claim:

1. A method for detecting a presence of an RF signal, comprising:
   receiving a sample of an RF frequency channel output from a radio receiver;
   forming with at least one computer processor a sample correlation matrix A from said sample of said radio frequency channel;
   calculating with said at least one computer processor a trace tr(A) of the sample correlation matrix;
   calculating with said at least one computer processor a determinant det(A) of the sample correlation matrix; and
   performing at least one calculation with said at least one computer processor to selectively determine a presence or absence of a signal on said radio frequency channel, where said trace and said determinant both define terms of a single mathematical equation used during said performing, said single mathematical equation comprising a minuend at least partially defined by said determinant and a subtrahend at least partially defined by said trace.

2. The method according to claim 1, wherein said at least one calculation to selectively determine the presence or absence of a signal on said radio frequency channel comprises computing a ratio of det(A) and max(det(A)), where max(det(A)) is a maximum possible value for the determinant of matrix A.

3. The method according to claim 2, wherein max(det(A)) is computed as $$\left(\frac{tr(A)}{N}\right)^N$$

where N is the number of rows and the number of columns of the sample correlation matrix A.

4. The method according to claim 2, further comprising selectively determining a presence or absence of said signal on said radio frequency channel based on said ratio.

5. The method according to claim 2, further comprising determining a presence or absence of said signal based on a comparison of said ratio to a threshold value T.

6. A method for detecting a presence of an RF signal, comprising:
- receive a sample of an RF frequency channel output from a radio receiver;
- forming with at least one computer processor a sample correlation matrix A from said sample of said radio frequency channel;
- calculating with said at least one computer processor a trace tr(A) of the sample correlation matrix;
- calculating with said at least one computer processor a determinant det(A) of the sample correlation matrix;
- performing at least one calculation with said at least one computer processor to selectively determine a presence or absence of a signal on said radio frequency channel based on said trace and said determinant, where said calculation comprises computing $S=T \cdot det(A)-(tr(A)/N)^N$ where N is the number of rows and the number of columns of the sample correlation matrix A and T is a threshold value; and
- selectively determining a presence or absence of a signal on said radio frequency channel based on a calculated value of S.

7. The method according to claim 6, further comprising specifying said presence or absence of said signal based on a sign of said calculated value of S.

8. The method according to claim 7, further comprising indicating a presence of said signal if said calculated value of S is negative.

9. The method according to claim 7, further comprising indicating an absence of said signal on said radio frequency channel if said calculated value of S is positive.

10. The method according to claim 6, further comprising selecting said value of T which substantially consistently produces a value of S that is greater than zero only when said sample is comprised exclusively of white noise.

11. A cognitive radio transceiver, comprising
- a radio receiver configured to detect an RF signal; and
- at least one processor configured to
  - receive a sample of an RF frequency channel output from a radio receiver;
  - form with at least one computer processor a sample correlation matrix A from said
  - sample of said radio frequency channel;
  - calculate a trace tr(A) of the sample correlation matrix;
  - calculate a determinant det(A) of the sample correlation matrix; and
  - perform at least one calculation to selectively determine a presence or absence of a signal on said radio frequency channel, where said trace and said determinant both define terms of a single mathematical equation used during performance of said calculation, said single mathematical equation comprising a minuend at least partially defined by said determinant and a subtrahend at least partially defined by said trace.

12. The radio transceiver according to claim 11, wherein said at least one processor is further configured to determine the presence or absence of a signal on said radio frequency channel by computing a ratio of det(A) and max(det(A)), where max(det(A)) is a maximum possible value for the determinant of matrix A.

13. The radio transceiver according to claim 12, wherein said at least one processor is further configured to compute max(det(A)) as $$\left(\frac{tr(A)}{N}\right)^N$$

where N is the number of rows and the number of columns of the sample correlation matrix A.

14. The radio transceiver according to claim 12, wherein said at least one processor is further configured to selectively determine a presence or absence of said signal on said radio frequency channel based on said ratio.

15. The radio transceiver according to claim 12, wherein said at least one processor is further configured to selectively determine a presence or absence of said signal based on a comparison of said ratio to a threshold value T.

16. A cognitive radio transceiver, comprising
- a radio receiver configured to detect an RF signal; and
- at least one processor configured to
  - receive a sample of an RF frequency channel output from a radio receiver;
  - form with at least one computer processor a sample correlation matrix A from said sample of said radio frequency channel;
  - calculate a trace tr(A) of the sample correlation matrix;
  - calculate a determinant det(A) of the sample correlation matrix;
  - perform at least one calculation to selectively determine a presence or absence of a signal on said radio frequency channel based on said trace and said determinant, where said calculation comprises computing $S=T \cdot det(A)-(tr(A)/N)^N$ where N is the number of rows and the number of columns of the sample correlation matrix A and T is a threshold value; and
  - selectively determining a presence or absence of a signal on said radio frequency channel based on a calculated value of S.

17. The radio transceiver according to claim 16, wherein said at least one processor is further configured to specify said presence or absence of said signal based on a sign of said calculated value of S.

18. The radio transceiver according to claim 17, wherein said at least one processor is further configured to indicate a presence of said signal if said calculated value of S is negative.

19. The radio transceiver according to claim 17, wherein said at least one processor is further configured to indicate an absence of said signal on said radio frequency channel if said calculated value of S is positive.

20. The radio transceiver according to claim 16, wherein said at least one processor is further configured to select said value of T which substantially consistently produces a value of S that is greater than zero only when said sample is comprised exclusively of white noise.

* * * * *